Aug. 6, 1940.  C. JOBST  2,210,590
AUTOMOBILE
Filed Aug. 30, 1937  5 Sheets-Sheet 1

INVENTOR
CONARD JOBST
BY
*Whittemore Hulbert & Belknap*
ATTORNEYS

Aug. 6, 1940.　　　　　C. JOBST　　　　　2,210,590
AUTOMOBILE
Filed Aug. 30, 1937　　　5 Sheets-Sheet 2

INVENTOR
CONARD JOBST
BY
Whittemore Hulbert + Belknap
ATTORNEYS

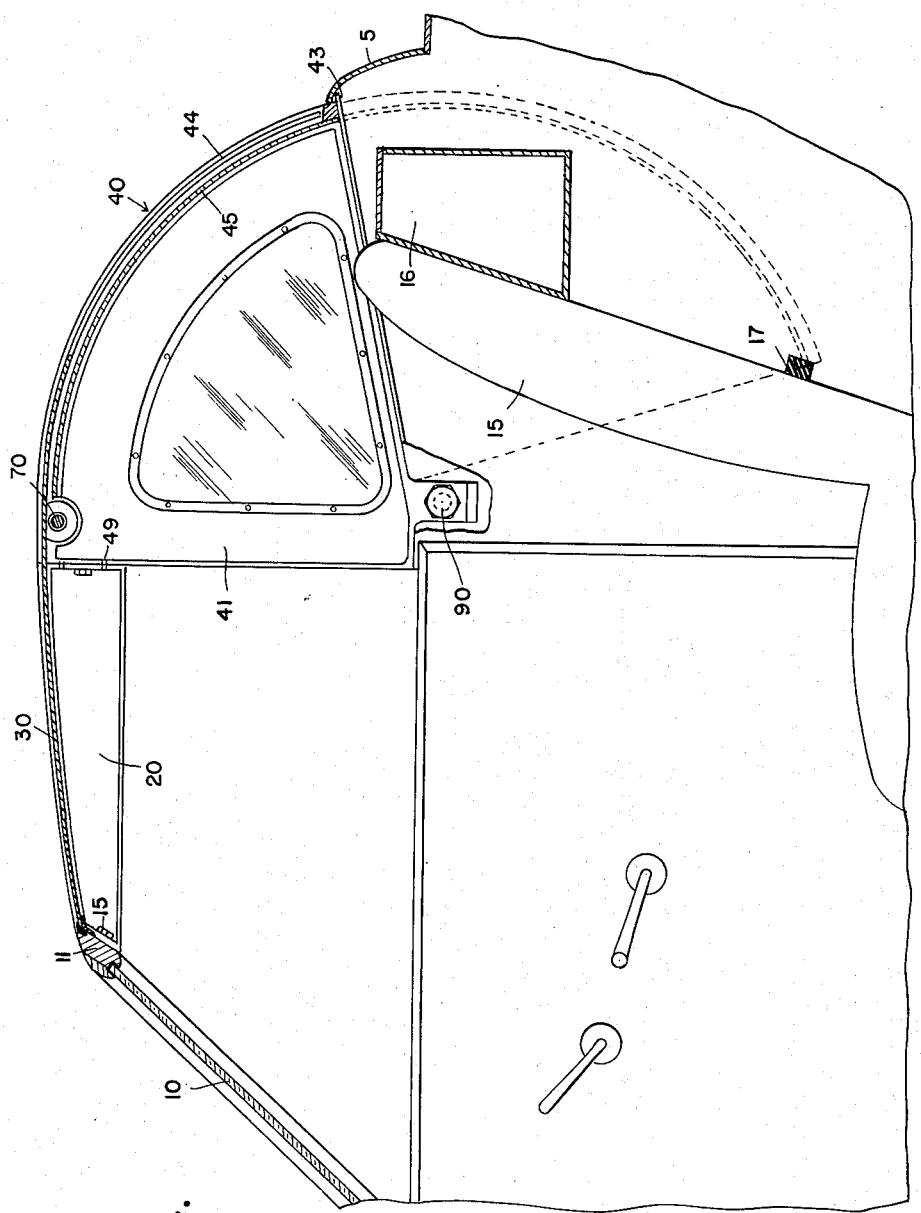

Aug. 6, 1940.   C. JOBST   2,210,590
AUTOMOBILE
Filed Aug. 30, 1937   5 Sheets-Sheet 4
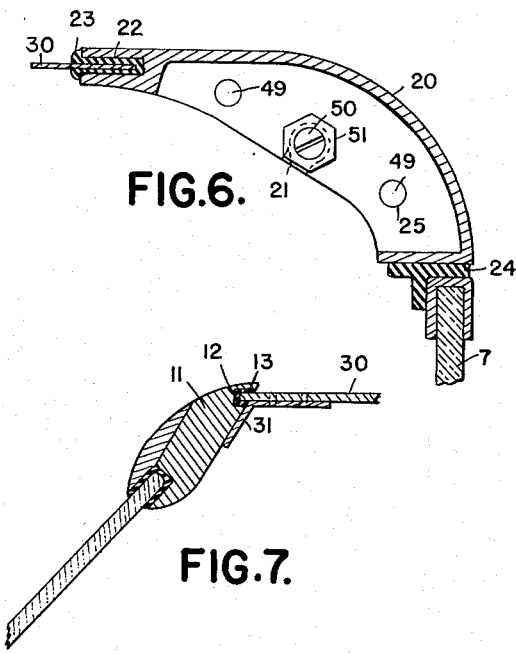
FIG.6.
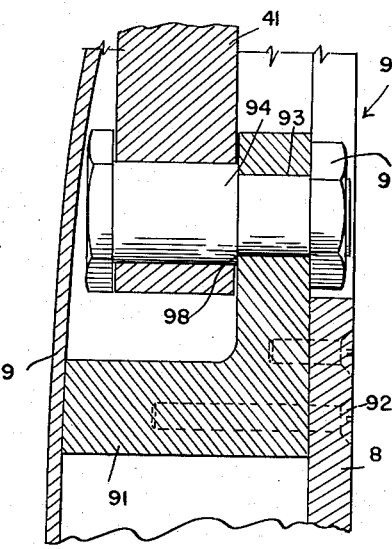
FIG.5.
FIG.7.
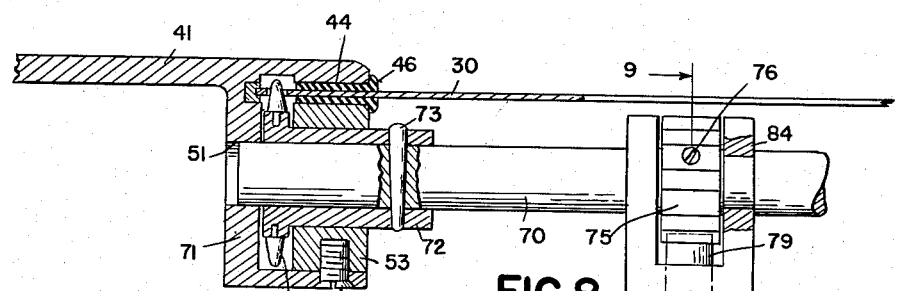
FIG.8.
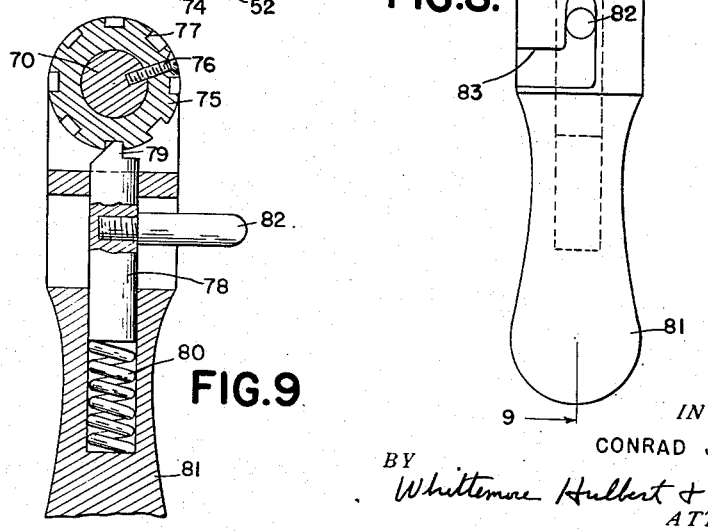
FIG.9.
INVENTOR
CONRAD JOBST
BY Whittemore Hulbert & Belknap
ATTORNEYS Aug. 6, 1940.                C. JOBST                2,210,590
                            AUTOMOBILE
               Filed Aug. 30, 1937        5 Sheets-Sheet 5

*INVENTOR*
CONRAD JOBST
BY *Whittemore Hulbert & Belknap*
*ATTORNEYS*

Patented Aug. 6, 1940

2,210,590

UNITED STATES PATENT OFFICE 2,210,590

AUTOMOBILE

Conrad Jobst, Toledo, Ohio

Application August 30, 1937, Serial No. 161,658

3 Claims. (Cl. 296—107)

This invention relates to a convertible automobile and more particularly to a novel top structure therefor.

It is an object of the invention to provide a top portion for an automobile which can quickly and easily be moved into concealed position.

It is a further object of this invention to provide a top for a vehicle comprising a rigid rear top portion, side rails for connecting said rear top portion to the windshield of the vehicle and a unitary flexible metal top closure member adapted to be concealed within the rear top member or to be extended between the side rails to abut the windshield and to completely enclose the vehicle.

It is a further object of the invention to provide novel mechanism for moving the flexible top closure relative to the vehicle.

It is a further object of the invention to provide novel, quickly demountable securing means for the parts of my improved vehicle top.

It is a further object of the invention to provide a demountable top for a vehicle having only two removable parts.

It is a further object of the invention to provide side rails connecting the rear top closure and the windshield which have sealing means adapted to cooperate with the conventional windows carried in the doors of the vehicle.

It is a further object of the invention to provide guiding means for the flexible metal top closure which have efficient weatherproofing means therein.

It is a further object of the invention to provide a flexible metal top closure for a vehicle which is highly flexible in one direction and substantially inflexible in a direction at right angles to the first mentioned direction.

It is a further object of the invention to provide a flexible metal top closure for a vehicle body, said top closure being mounted in parallel opposed grooves and said top closure being flexible in a direction parallel to the grooves and substantially inflexible in a direction perpendicular to the grooves.

It is a further object of my invention to provide a slidable flexible metal top closure member for a vehicle which has aligned perforations therein and to provide a cooperating toothed wheel for moving said top closure member.

It is a further object of the invention to provide a toothed wheel for moving the slidable top closure member and an improved ratchet mechanism for rotating the wheel.

Other objects will be apparent as this description proceeds and when taken in connection with the accompanying drawings in which Fig. 1 is a perspective of a vehicle with my improved top in operative position;

Fig. 4 is a section on the lines 4—4 of Fig. 3;

Fig. 5 is a section on the lines 5—5 of Fig. 2;

Fig. 6 is a detail section on the line 6—6 of Fig. 2;

Fig. 7 is a detail section on the lines 7—7 of Fig. 3;

Fig. 8 is a detail section on the lines 8—8 of Fig. 2;

Fig. 9 is a section of the ratchet mechanism taken on the lines 9—9 of Fig. 8;

Figure 1:
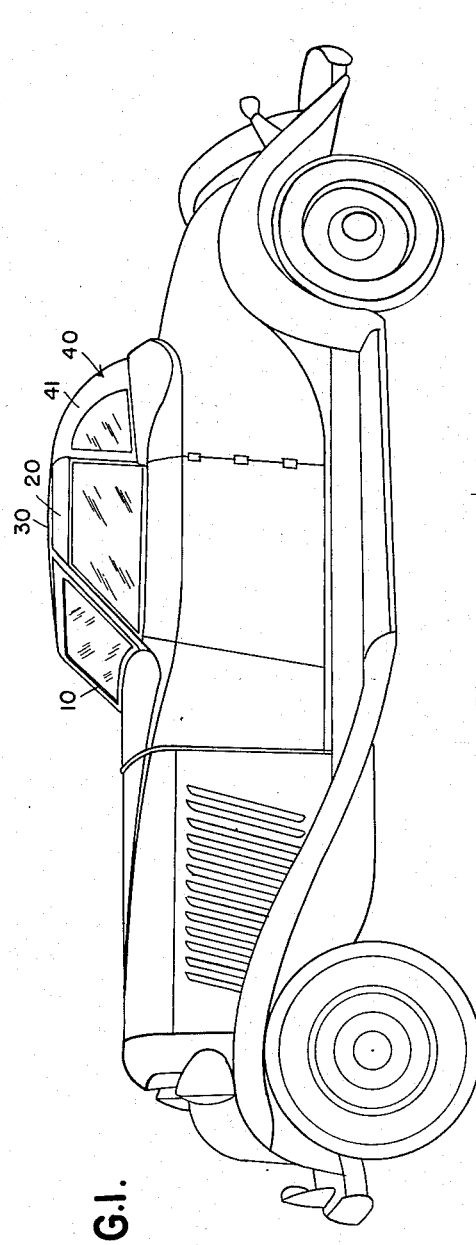

The top structure shown in the accompanying figures is adapted to be completely housed within the body portion of the vehicle, or to be rigidly and solidly held in operative position, as shown in Fig. 1. In this figure I have illustrated a vehicle having a windshield 10, a rear top portion 40, side rails 20 connecting the rear top portion and the windshield, and a top closure 30.

The rear top member 40, as best seen in Fig. 4, comprises two sector-shaped side members 41 which are pivotally mounted at 90 and which are interconnected by a thin metal plate 45. The plate 45 is attached to side members 41 by suitable securing means 48. A packing 47 of suitable material may be provided to insure water tight relationship between the parts. This metal plate 45 is adapted to form part of the outside top of the vehicle when the slidable top closure 30 is in forward position, and in addition structurally interconnects members 41. Journaled in depending lugs on the plates 41 and extending therebetween, as best seen in Fig. 8, is a rotatable rod 70 to which is connected mechanism for moving the top closure 30.

Side rails 20 are detachably connected to the sector-shaped side members 41 by an arrangement best illustrated in Fig. 6. A screw-threaded stud 50 is permanently secured to the members 41 and a nut 51 is threaded onto the projecting end thereof, preferably in non-detachable relation. Two projecting pins 49 are positioned adjacent the stud 50 and are adapted to form additional guiding and securing means for the side rails 20. The side rails 20 have apertures 25 adapted to fit over the pins 49. A laterally open recess 21 is formed in one end of each of the rails 20. The arrangement is such that this recess may be slipped over the stud 50 in back of the nut 51 and the nut 51 tightened down thereon with a minimum amount of time and effort. The opposite end of the side rails 20 have similar provisions for being detachably secured to the frame member 11 forming the top of the windshield 10. A strip 24 of suitable material serves as a cushion and sealing means for the usual adjustable side window 7.

The arrangement just described contributes materially to the ease of conversion from an open to a closed vehicle. The side bars are locked in accurately positioned relation on the rear top, the rear top is pivoted into operative position. The bars 20 are guided into position adjacent the windshield frame 11, with the locking means automatically engaged by the simple swinging movement of the rear top. All that remains is to turn up the lock nuts a turn or so.

With the rear top member 40 and the side rails 20 in assembled position as shown in Fig. 4, the parts are maintained with extreme rigidity and in rattle-proof relation.

Figure 11:
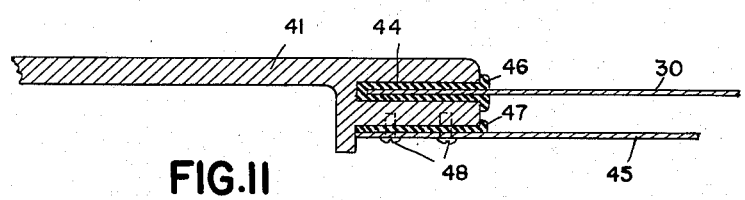
Fig. 11 is a detail section taken on the lines 11—11 of Fig. 2.

The rear top member 40 has curved opposed grooves 44 formed in side plates 41. As best seen in Fig. 11, these grooves 44 in the side members 41 are of considerable depth and have a grommet 46 received therein. This grommet is of suitable material to insure sealing relationship between the members 41 and 30. The dimensions of these parts are such that when the top closure 30 is retracted to its extreme rearward position, it will be entirely housed within the rear top member 40.

As best seen in Fig. 5, the rear top member 40 is pivotally mounted at 90. The door pillar 8 of the vehicle frame has secured thereto by suitable securing means 92 a block 91. This block is interposed between the door pillar and outside panel 9 of the vehicle. On an upwardly projecting portion of the block 91 is mounted a pivot pin 94. This pin 94, as seen in Fig. 5, has a shoulder portion 98 which abuts the projection and is clamped thereto by a nut 95. The opposite end of the pivot pin 94 has a head thereon and received between this head and the projection is the corner of the sector-shaped plate 41. As can readily be seen, this plate is mounted for free rotation, nut 95 merely clamping the shoulder 98 against the projection of block 91.

The rear top member 40 is intended to be pivoted about the pivot 90 into a concealed position within the body of the vehicle. As best seen in Fig. 4, the body of the vehicle is formed so as to provide a recess which will receive the rear top member when it is swung downwardly and rearwardly. Secured to the back of the seat 15 of the vehicle is a suitable resilient stop 17 against which an edge of the rear top member rests when in concealed position. Also secured to the back of the seat 15 of the vehicle is a box 16 which may receive the detachable side rails 20 when they are removed from the rear top member.

Figure 10:
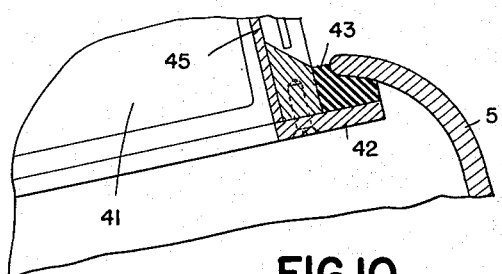
Fig. 10 is a detail section taken on the lines 10—10 of Fig. 3.

As best seen in Fig. 10, the rear top portion 40 has a shoulder plate 42 secured across the lower back edge thereof. Attached to the top of this plate is a rubber strip 43 which is adapted to engage an upwardly curved portion 5 of the rear of the vehicle and to seal the interior of the vehicle at this point in weatherproof relation. Other sealing provision may be made, or suitable drainage provided to prevent ingress of water.

Received within the opposed parallel slots 44 in the rear top member 40 is a unitary flexible metal top closure member 30. Mechanism to be described in detail is carried by the rear top member 40 to slide the top closure member 30 in the grooves. When the side rails 20 are in the position shown in Fig. 4, the grooves 22 in the side rails are continuations of the grooves 44 formed in the rear top member. As seen in Fig. 6, these grooves have relatively deep grommets 23 of rubber or other suitable material which will provide an adequate weather seal.

The top adjusting mechanism, best shown in Figs. 8 and 9, comprises a shaft 70 journaled in apertures 51 in projections 71 formed on the side members 41. This shaft has secured thereto at each end a collared flange 72 pinned to the shaft 70 by a pin 73. Flanges 72 have peripheral teeth 74 therein. The flexible top closure member 30 has aligned apertures 32 along each side thereof in which the teeth 74 engage. It will be apparent that rotation of the shaft 70 in either direction will cause the flexible top closure member 30 to slide along the grooves in the side rails 20 and in the rear top member.

In order to provide for each manipulation of the top I provide a ratchet assembly attached to the shaft 70, best shown in Figs. 8 and 9. This assembly comprises a ratchet wheel 75 with teeth 77 rigidly attached to the shaft 70 by a screw 76. In order to provide for operation of the wheel in either direction, I provide a handle 81 with upwardly projecting apertured lugs 84 adapted to be rotatably mounted on the shaft 70, on either side of the ratchet wheel 75. A uni-directional dog 78 is mounted in the handle 81 and is biased toward the ratchet wheel 75 by a spring 80. As best seen in Fig. 9, oscillation of the handle 81 will cause the engaging portion 79 of the dog 78 to engage the ratchet wheel 75 and to rotate the same in a counter-clockwise direction as seen in this figure. In order to provide for the reversing of rotation of the flange 72, I provide a finger 82 on the dog 78. This finger is adapted to project through a U-shaped groove 83 formed in the handle 81. The upright portions of this U-shaped groove are positioned diametrically opposite each other in the handle. As will be readily apparent, the finger 82 may be pushed downwardly, rotated through 180° and allowed to be moved upwardly by the spring 80. In this new position, oscillation of the handle 81 will cause reverse rotation of the wheel 75.

The flexible top closure member 30 has on its forward edge an angle member 31, best seen in Fig. 7. This member is adapted to abut the frame portion 11 of the windshield and to serve as a stop means. The frame member 11 has a groove 12 formed therein and a grommet 13 positioned in the groove. When the flexible top 30 is moved to its extreme forward position, its forward edge will enter the groove 12 where the grommet 13 will maintain a sealed relationship between the parts.

Figure 12:
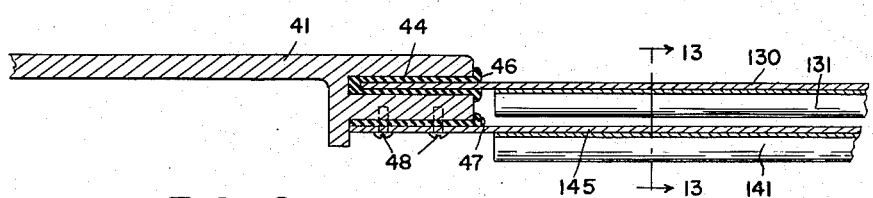
Fig. 12 is a view similar to Fig. 11 showing a modified form.
Figure 13:
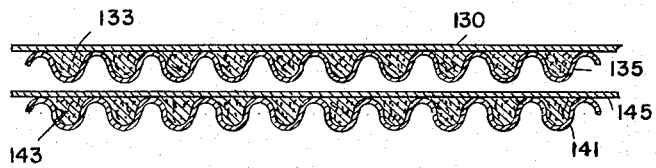
Fig. 13 is a section on the line 13—13 of Fig. 12.

The slidable top closure member 30 may be formed of a suitable sheet metal of sufficient rigidity to permit its being moved in the groove in the manner set forth. While I have found that a single sheet of metal is suitable for this flexible top closure member, I have illustrated in Figs. 12 and 13 a modified form of top closure which offers certain advantages over a single thickness of sheet metal. In these figures I have illustrated both the slidable top closure member and the closure portion interconnecting side plates 41 as formed by the same construction. In this modification, a generally smooth sheet 130 is attached to a second corrugated sheet 135 by suitable means. Preferably a permanent attachment is accomplished by welding the tangent portions of the corrugated sheet 135 to the sheet 130. This forms closed spaces 133 between adjacent corrugations and these may be filled with suitable insulating material if desired. The construction of the closure member interconnecting side plates 41 is similar. A generally smooth sheet of metal 145 is secured to a corrugated sheet 141, preferably by welding and the resulting enclosed spaces 143 may be filled with suitable insulating material if desired. This last construction offers several advantages over the use of a single sheet of metal as top members. As will be readily understood, a sheet formed as shown in Fig. 13 will retain its flexibility in one direction, but due to the corrugations will be substantially inflexible in a direction at right angles thereto. Since the movable top closure member is to be received between opposed parallel slots, it will be appreciated that any flexibility in a direction perpendicular to these slots would be undesirable, and if too great, would lead to leakage between the slot and edges of the top member. By employing the construction illustrated in Fig. 13, the top closure member is substantially inflexible in a direction perpendicular to the slots.

Figure 2:
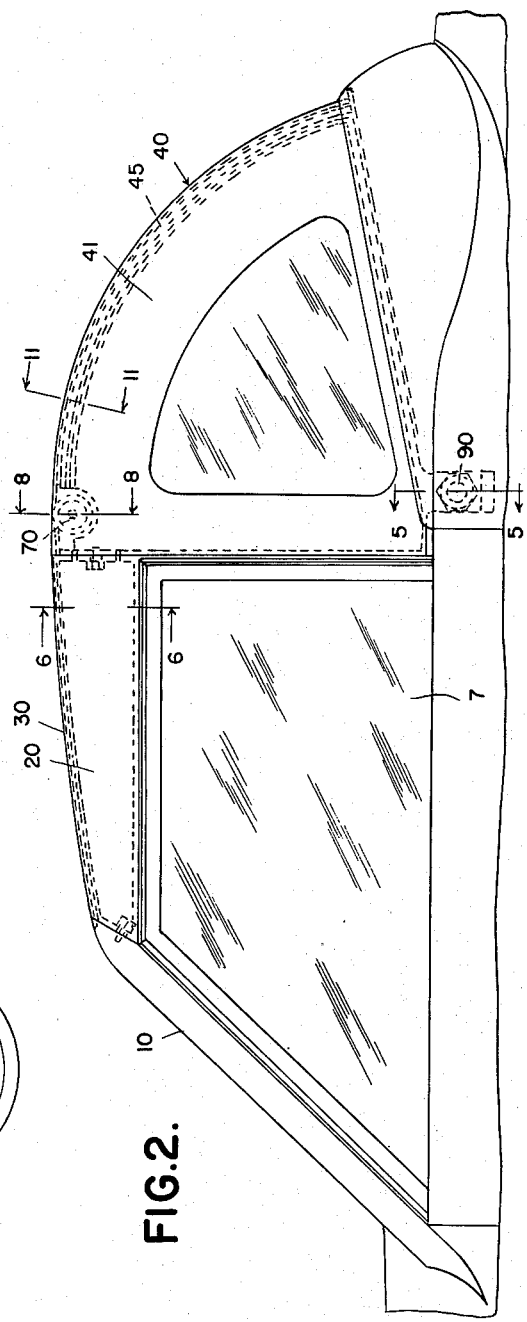
Fig. 2 is an enlarged side view of my improved top structure.
Figure 3:
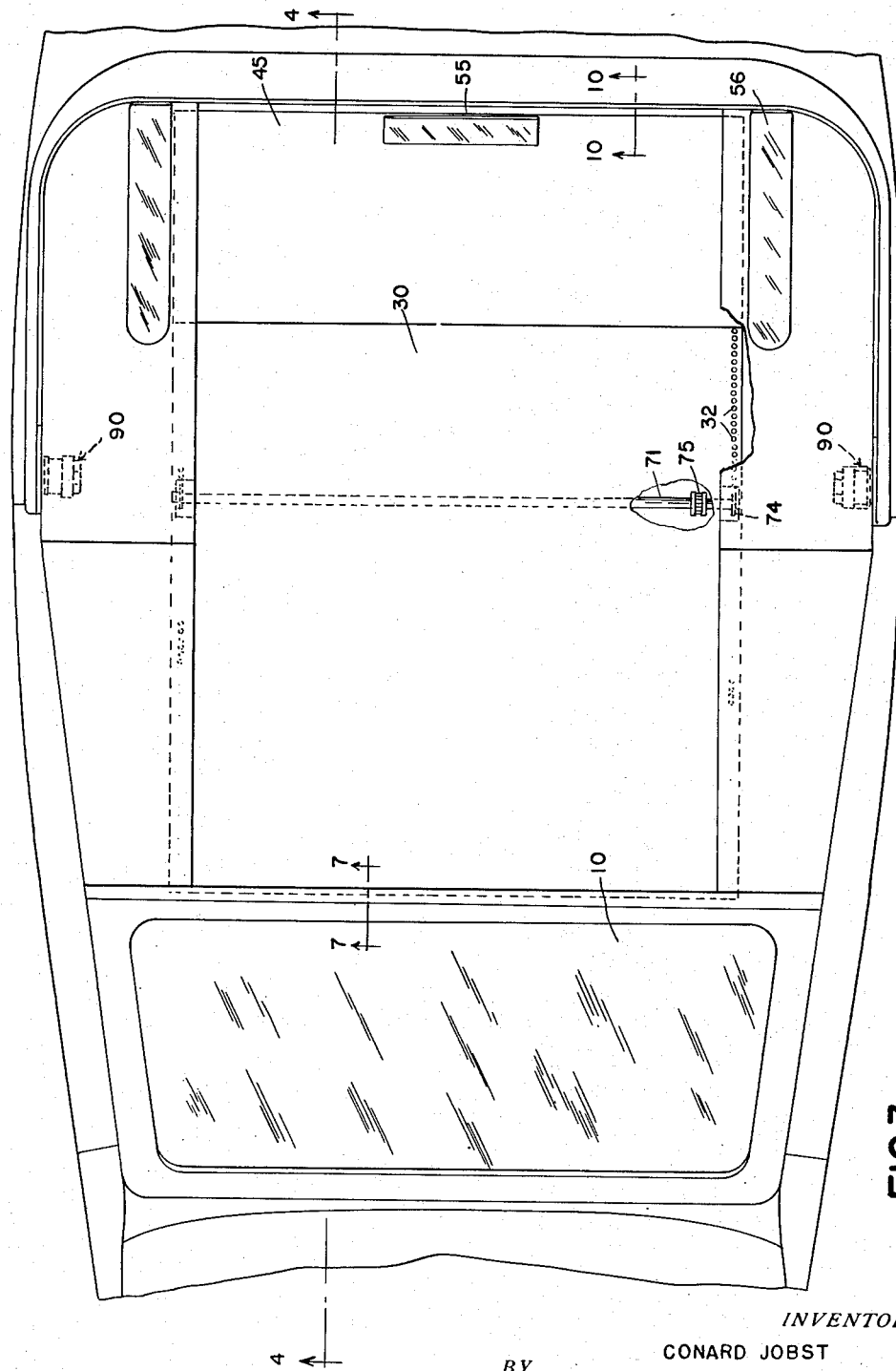
Fig. 3 is a top plan view of the vehicle with portions broken away.

Another aspect of my invention resides in the relationship between the windshield and the top structure. I have found that by placing the windshield 10 at sufficient great angle to the vertical, as illustrated in Figs. 1 and 2, there will be substantially no eddy currents felt within the space occupied by passengers of the vehicle when the top 30 is in retracted position. This is largely due to the inclination of the windshield but is due in part also, I believe, to the fact that when the top is in inoperative position, it is completely enclosed within the body of the vehicle and presents no surfaces which tend to create eddy currents. I have found that with the top 30 of my vehicle in its concealed position, it is possible to drive without the unpleasant eddy currents normally felt in vehicles of this general type when driven with the top down.

I wish particularly to call attention to the rigidity and facility with which my improved top may be raised from concealed position and placed into operative position. The first step is to attach the side rails 20 to the rear top portion 40. This is accomplished by slipping the end plate of the side rails 20 over the nuts 51 and tightening this nut which may be accomplished in a fraction of a turn. The rear top portion 40 is then swung into upright position and the side rails 20 are thereby guided into operative engagement with the rail 11 of the windshield. Due to the fact that pins 49 have positioned the side rails 20 accurately, the rails will be guided into accurate cooperating relationship with the rail 11. In order to rigidly secure the rail 20 to the windshield 11 it is only necessary to take a fractional turn on the nut 15. The steps so far recited can be executed by anyone in a few seconds, and the resulting structure is assembled in rigid rattle-proof relationship.

With the parts in this position, the top directly over the driver's seat, as can be seen in Fig. 4, is open to the elements. I have found that with the top 30 in its retracted position, an improved ventilation effect is obtained. An adequate supply of fresh air is introduced into the vehicle and at the same time the undesirable drafts and eddy currents in the car are avoided. It will also be apparent, of course, that this arrangement will permit at certain times exposure of the occupant of the car to sunlight, if so desired.

As previously defined, the side rails 20 form abutments for the top of the conventional windows in the doors of the vehicle, and with the parts assembled as shown in Fig. 4, the windows may be raised or lowered at will. When in their raised position they will abut suitable sealing means on side rails 20 and maintain the sides of the top of the vehicle in weatherproof relation.

If it is desired to close the top of the vehicle, it is necessary only to oscillate the handle 81 back and forth. As previously explained in connection with the ratchet mechanism, this handle may be operative to move the top from its retracted position within the top rear portion 40 to a position where it abuts the windshield frame 11 or vice versa. The mechanism provided for moving the top closure 30 is simple in the extreme and provides a very easy and rapid mechanism for adjusting the top 30 to desired position. It is of course understood that the top 30 may be left in retracted position or in closed position, or in any intermediate position and is so constructed that if in an intermediate portion, it is rigidly supported in rattle-proof relation.

While I have illustrated and described various preferred embodiments of my invention, it will be apparent to those skilled in the art that various additions, omissions, substitutions and modifications may be made within the scope of my invention, as indicated by the appended claims.

What I claim as my invention is:

1. A convertible vehicle comprising a body portion having a windshield frame and a recess at the top rear thereof, an arcuate shaped solid rear top pivoted to said body adjacent said recess and adapted to be completely housed within said recess or to be pivoted therefrom into operative position, rigid side rails adapted to interconnect said rear top and said windshield frame, said rear top having curved opposed parallel grooves substantially concentric with said arcuate rear top and the pivot point of said rear top, said rails having opposed grooves formed therein in registry with the grooves in said rear top, and a flexible metal top slidable in said grooves and adapted to be completely concealed in said rear top or projected therefrom to span the area between the rear top and the windshield frame.

2. A convertible vehicle comprising a body portion having a windshield frame and a recess at the top rear thereof, a solid rear top pivoted to said body adjacent said recess and adapted to be completely housed within said recess or to be pivoted therefrom into operative position, rigid side rails adapted to interconnect said rear top and said windshield frame, said rear top having curved guiding means therein and said rails having guiding means therein, and a longitudinally flexible sheet top slidably engaging said curved guiding means and adapted to be completely concealed in said rear top or projected therefrom in sliding engagement with said guiding means in said rails to span the area between said rear top and said windshield frame.

3. A convertible vehicle comprising a body portion having a windshield frame and a recess at the top rear thereof, an arcuate-shaped solid rear top pivoted to said body adjacent said recess and adapted to be completely housed within said recess or to be pivoted therefrom into operative position, rigid side rails adapted to be secured at one end to said rear top to project upwardly therefrom when said top is in said recess, positioning means for retaining said rails in predetermined position relative to said rear top, said rear top having curved opposed parallel grooves therein, said rails having opposed grooves formed therein in registry with said curved grooves, and a longitudinally flexible sheet top slidably engaging said curved grooves and adapted to be completely concealed in said rear top or projected therefrom to engage the grooves in said side rails to span the area between said rear top and said windshield frame.

CONRAD JOBST.